United States Patent
Segal et al.

(10) Patent No.: US 7,274,868 B2
(45) Date of Patent: Sep. 25, 2007

(54) METHOD AND APPARATUS FOR CREATING AERIAL PANORAMIC PHOTOGRAPHY

(76) Inventors: Mark Segal, 533 S. East Ave., Oak Park, IL (US) 60304; Jeff Jones, 4189 Ruskin Rd., Rockford, IL (US) 61101

( * ) Notice: Subject to any disclaimer, the term of this patent is extended or adjusted under 35 U.S.C. 154(b) by 0 days.

(21) Appl. No.: 11/253,338

(22) Filed: Oct. 18, 2005

(65) Prior Publication Data

US 2006/0083501 A1   Apr. 20, 2006

Related U.S. Application Data

(60) Provisional application No. 60/619,564, filed on Oct. 18, 2004.

(51) Int. Cl.
*G03B 39/00* (2006.01)
(52) U.S. Cl. ...................................................... 396/12
(58) Field of Classification Search .................... 396/7, 396/12, 13, 21–24; 348/144–147, 211.2
See application file for complete search history.

(56) References Cited

U.S. PATENT DOCUMENTS

| | | | | |
|---|---|---|---|---|
| 3,638,052 A | * | 1/1972 | Massa | 310/324 |
| 5,034,759 A | * | 7/1991 | Watson | 396/7 |
| 5,628,033 A | * | 5/1997 | Dilich et al. | 396/7 |
| 5,752,088 A | * | 5/1998 | Desselle | 396/12 |

FOREIGN PATENT DOCUMENTS

JP   02231897 A   *   9/1990

OTHER PUBLICATIONS

English language ABSTRACT of JP 02231897 A.*

* cited by examiner

*Primary Examiner*—W. B. Perkey
(74) *Attorney, Agent, or Firm*—Knechtel, Demeur & Samlan

(57) ABSTRACT

An aerial photography apparatus that comprises a remote controlled piloted aircraft, a platform, a camera, and a remote wireless transmitter for operating and controlling the apparatus. The remote controlled piloted aircraft is attached to the top side of the platform. The camera is attached to the bottom side of the platform using a rigid member having a rotatable joint. The remote controlled piloted aircraft lifts and moves the apparatus to a desired location at a specific altitude above a particular property where the panoramic aerial photograph is to be taken. Depending upon the wind forces exerted upon the remote controlled piloted aircraft and the resulting orientation of the aircraft to maintain the camera at the desired location, the rotatable joint enables the gravitational weight of the camera to naturally gravitate to a vertical orientation or position relative to the ground. Alternatively, cushions in the platform or a suspension system may be used to achieve this position for the camera. A counterbalance weight is provided on the camera to counter the weight of the lens for maintaining the camera in a level balance while rotating through the three hundred and sixty degree rotation when creating the desired panoramic aerial photograph

17 Claims, 13 Drawing Sheets

METHOD AND APPARATUS FOR CREATING AERIAL PANORAMIC PHOTOGRAPHY

CROSS-REFERENCE TO RELATED APPLICATION

This patent application is a non-provisional application claiming priority from U.S. Provisional Application Ser. No 60/619,564, entitled "Method and Apparatus for Creating Aerial Panoramic Photography" filed on Oct. 18, 2004.

I. FIELD OF THE INVENTION

The present invention relates to aerial photography and, more particularly, to three hundred and sixty degree aerial panoramic photography taken at varying altitudes using a remote controlled piloted aircraft.

II. DESCRIPTION OF THE PRIOR ART

Many architects and developers of residential or commercial towers and skyscrapers, of parks, golf courses, and the like have come to realize that there is a value in providing aerial views of their property and the surrounding views. This is especially true during the planning, preconstruction, and/or presales activities. During this time, the architects and developers are typically seeking funding, advance sales, or other forms of money and support from a prospective partner or purchaser. In most instances, however, the tower, skyscraper, golf course has not yet been built. As a result, the prospective partner is unable to envision, for example, the penthouse views of the property, or fully appreciate the proposed design of a golf course or the design due to the blockage of trees and other landscape contours that are limiting the view from the ground.

To solve this problem and provide these views, a pilot would fly an aircraft such as a helicopter over the property. While the pilot manipulated the helicopter to the proper altitude and accounted for external forces such as wind, a photographer riding in the helicopter stabilized himself as best as possible and then manually took photographs of the desired views for the architect or developer. Although this system worked, the results were less than perfect. For example, the photographs were not always complete, or did not provide the proper views, thereby, requiring another flight and another series of photographs; the photographs did not always provide a complete view and required additional time and expense of splicing portions of multiple photographs to obtain the desired view; the photographs were not at the proper angles and therefore were not usable as they did not accurately reflect the view as it would appear from, for example, the penthouse of the proposed finished tower or skyscraper; the helicopter is difficult to hover safely making it dangerous for the photographer to stabilize himself and simultaneously take photographs; the cost of the helicopter and licensed pilot is expensive and dramatically increases if multiple flights are necessary to obtain satisfactory results; and, in many urban areas, a helicopter is illegal to fly at less than certain altitudes thereby restricting access to these areas and making it impossible to obtain the desired photographs.

Thus, there is a need and there has never been disclosed Applicant's unique method and apparatus for creating seamless three hundred and sixty degree panoramic photography that may be taken at varying altitudes using a remote controlled piloted vehicle.

III. SUMMARY OF THE INVENTION

The present invention is an aerial photography apparatus that comprises a remote controlled piloted aircraft, a platform, a camera, and a remote wireless transmitter for operating and controlling the apparatus. The remote controlled piloted aircraft is attached to the top side of the platform. The camera is attached to the bottom side of the platform using a rigid member having a rotatable joint. The remote controlled piloted aircraft lifts and moves the apparatus to a desired location at a specific altitude above a particular property where the panoramic aerial photograph is to be taken. Depending upon the wind forces exerted upon the remote controlled piloted aircraft and the resulting orientation of the aircraft to maintain the camera at the desired location, the rotatable joint enables the gravitational weight of the camera to naturally gravitate to a vertical orientation or position relative to the ground. Alternatively, cushions in the platform or a suspension system may be used to achieve this position for the camera. A counterbalance weight is provided on the camera to counter the weight of the lens for maintaining the camera in a level balance while rotating through the three hundred and sixty degree rotation when creating the desired panoramic aerial photograph.

IV. BRIEF DESCRIPTION OF THE DRAWINGS

The Description of the Preferred Embodiment will be better understood with reference to the following figures.

V. DETAILED DESCRIPTION OF THE PREFERRED EMBODIMENT

Figure 1:
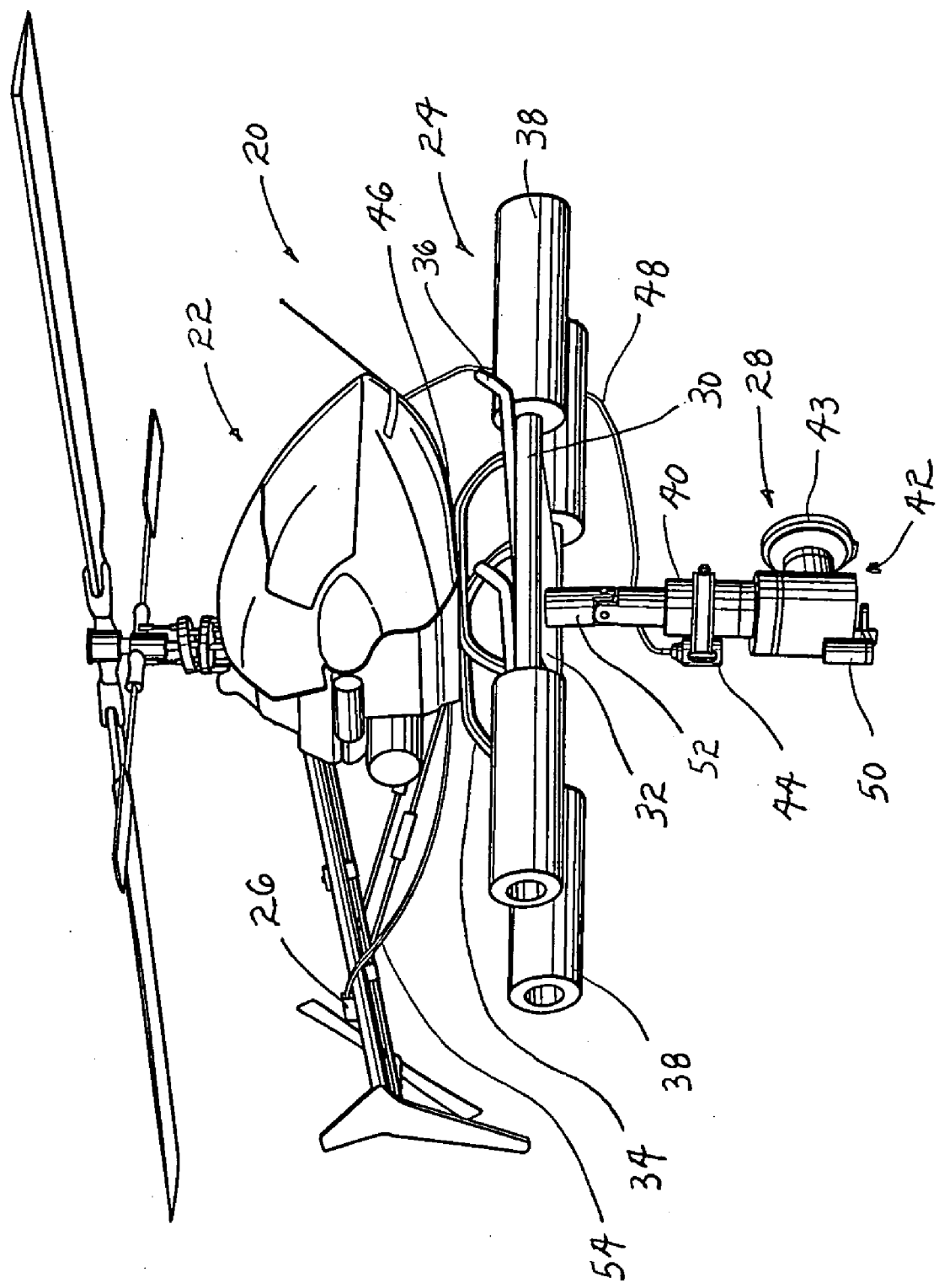
FIG. 1 is a perspective view of Applicant's invention and, in particular, illustrating the remote controlled piloted aircraft, the platform used for taking off and landing, and the camera equipment for creating the three hundred and sixty degree panoramic photography.

Turning first to FIG. 1, there is illustrated Applicant's photography apparatus 20. The apparatus 20 consists of a remote controlled piloted aircraft 22 (also may be referred to as remote controlled aircraft), a platform 24, a video camera 26, and a camera system 28.

For purposes of this patent application, the remote controlled piloted aircraft 22 is any unmanned machine or device capable of atmoshperic flight. This includes but is not limited to a helicopter, airplane, hot air balloon, etc . . . While the preferred embodiment of the remote controlled piloted aircraft 22 is a helicopter and it is this aircraft that is referred to throughout the specification, it is to be understood that any one person skilled in the art could use the inventive concept with any other type of remote controlled piloted aircraft.

As mentioned, in the preferred embodiment, the remote controlled piloted aircraft 22 is a helicopter. The helicopter may be any gas or electric powered helicopter available in the industry. Should the user desire increased efficiency from the helicopter, the helicopter may be customized to lift larger payloads of at least 10 pounds. This customization includes but is not limited to a larger engine and extra lift blades such as 800 ml blades. The helicopter is also provided with a servo 46 for receiving and transmitting signals and a support base 34 having a pair of landing gear skids 36, the purposes of which are discussed in more detail later in the specification.

The platform 24 consists of a flat plate 32 and a pair of landing posts 30. In the preferred embodiment, the flat plate 32 has four sides and is square in shape. Alternatively, the flat plate 32 may be any size and shape. The pair of landing posts 30 are attached at opposite sides of the flat plate 32. The pair of landing gear skids 36 of the helicopter are attached to the pair of landing posts 30 perpendicular to one another such that each skid 36 is independently attached to both of the landing posts 30. In this manner, the support base 34 of the helicopter is securely attached to the platform 24.

Situated at the distal ends of the landing posts 30 are foam ends 38. When the apparatus 20 is not in use, the platform 24 is supported by a launch pad (not illustrated). The foam ends 38 are used for providing stability and a smooth take off and landing of the apparatus 20.

The camera system 28 is comprised of a motor 40, a camera 42, a camera lens 43, and an electrical plug 44. An electrical wire 48 extends from the servo 46 on the helicopter down and into the electrical plug 44. In the preferred embodiment, the camera 28 is a 360 degree rotating panoramic camera which means that the camera 42 can rotate through 360 degrees for creating a three hundred and sixty degree panoramic aerial photograph. In the preferred embodiment, the camera system is a 28/220 camera manufactured by Seitz Company located in Switzerland. The camera 42 uses slit scan process to rotate film (220 format) past slit in conjunction with lens moving in the opposite direction at high speed. Nikon 28 mm, for example, has a focal length shift optic lens that allows for horizontal adjustment. Preferably, one three hundred and sixty degree revolution for the camera 42 takes approximately 0.5 to 0.8 seconds. Equivalent shutter speed measures approximately 1/500th of a second.

A counterbalance weight 50 is attached to the camera 42 at the opposite side of the camera 42 from the camera lens 43. When the camera 42 is rotating through the three hundred and sixty degree revolution, the weight of the camera lens 43 creates a downward gravitational pull on the camera 42 such that, if not corrected, the rotation of the camera 42 would not remain in a constant, horizontal plane relative to the ground while it rotates through 360 degrees. The counterbalance weight 50 is used to provide sufficient weight on the opposite side of the camera 42 to counter the weight of the camera lens 43 and, thereby, permit the camera 42 to maintain a constant, even balanced, horizontal plane relative to the ground during the three hundred and sixty degree revolution for the photograph.

The video camera 26 is affixed to the tail of the helicopter and provides a video electrical wire 54 that extends from the video camera 26 to the servo 46. In the preferred embodiment, the video camera 26 continually transmits video images from the helicopter. Preferably, the video camera 26 should be of a relatively small size such that it may be attached to the tail of the helicopter without disrupting the flying characteristics of the helicopter. Accordingly, the video camera 26 may be any standard video camera known to one skilled in the art.

Figure 2:
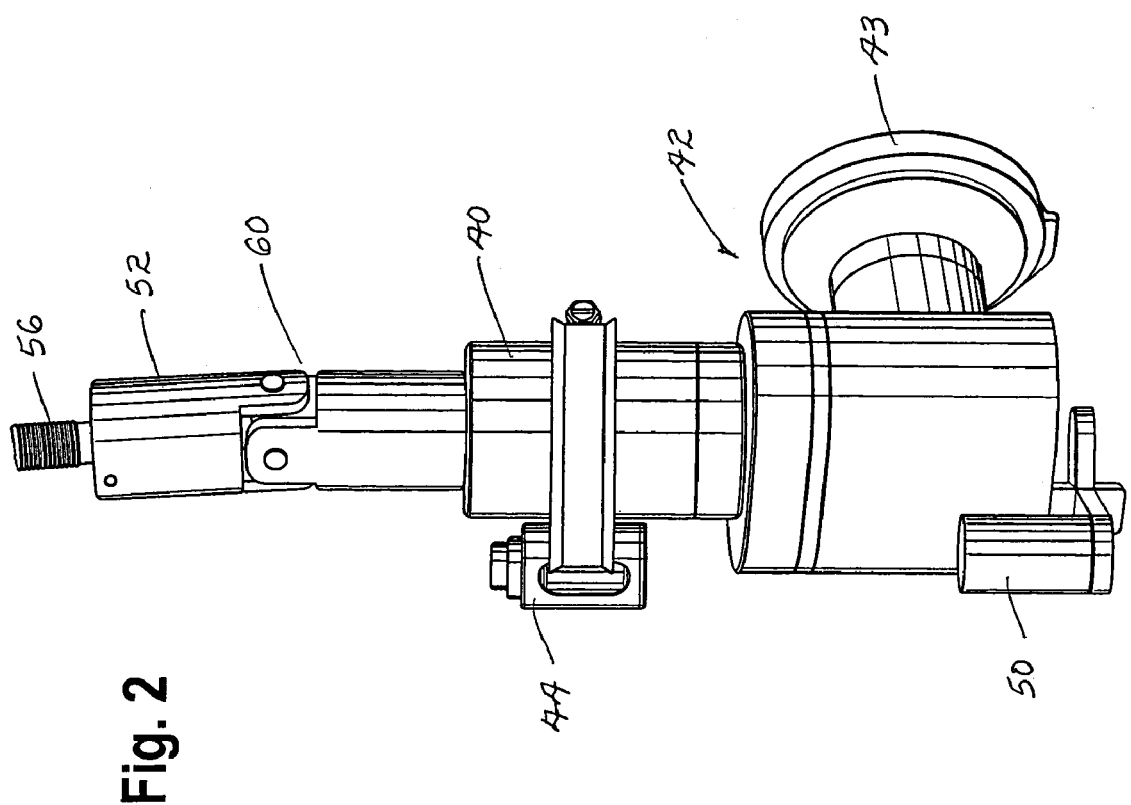
FIG. 2 is an enlarged side view, with portions removed, of the camera equipment and means for attaching the camera equipment to the platform.

The camera system 28 is attached to the flat plate 32 by a rigid member 52. This is more clearly illustrated in FIG. 2. The rigid member 52 may be any steel, aluminium, alloy, plastic, or any other type of rigid material known to one skilled in the art. The rigid member 52 provides a threaded bolt 56 for being received into a reciprocal threaded bore located in the flat plate 32 (not illustrated). Alternatively, it is contemplated that any other means known to one skilled in the art may be used for attaching the rigid member 52 to the flat plate 32. In the preferred embodiment, the camera system 28 is mounted upside down or in the inverted position with respect to the remote controlled piloted aircraft 22 and platform 24.

The rigid member 52 also provides a rotatable joint 60. In the preferred embodiment, the rotatable joint 60 is a 3 pound steel ball and u-joint socket. In the preferred embodiment, when the remote controlled piloted aircraft 22 pitch and yaws in a direction as it accounts for the wind, the gravitational weight of the camera system 28 naturally applies a downward force on the rigid member 52 for positioning the camera system 28 into a vertical orientation or position relative to the ground. The rotatable joint 60 enables the camera system 28 to obtain this natural vertical orientation or position and independent from any position of the remote controlled piloted aircraft 22. If necessary, adhesive electrical tape may be used to provide a slight restriction means on the movement of the rotatable joint 60 for eliminating unnecessary movement within the rotatable joint 60 due to external forces such as excessive wind when the camera system 28 is in vertical orientation or position. Alternatively, it is contemplated that any other means known to one skilled in the art may be used for providing a rotatable joint in the rigid member 52 to accomplish the intended purposes described herein.

In use, the photography apparatus 20 is placed on the launch pad (not illustrated). Preferably, the launch pad rests on the ground and supports the landing posts 30 of the platform 24. In this manner, the launch pad provides a safe clearance between the ground and the camera system 28 which prevents the camera system 28 from coming into contact or being damaged with the ground as the camera system 28 naturally extends from the flat plate 32 toward the ground in its pre-takeoff rest position.

Figure 3:
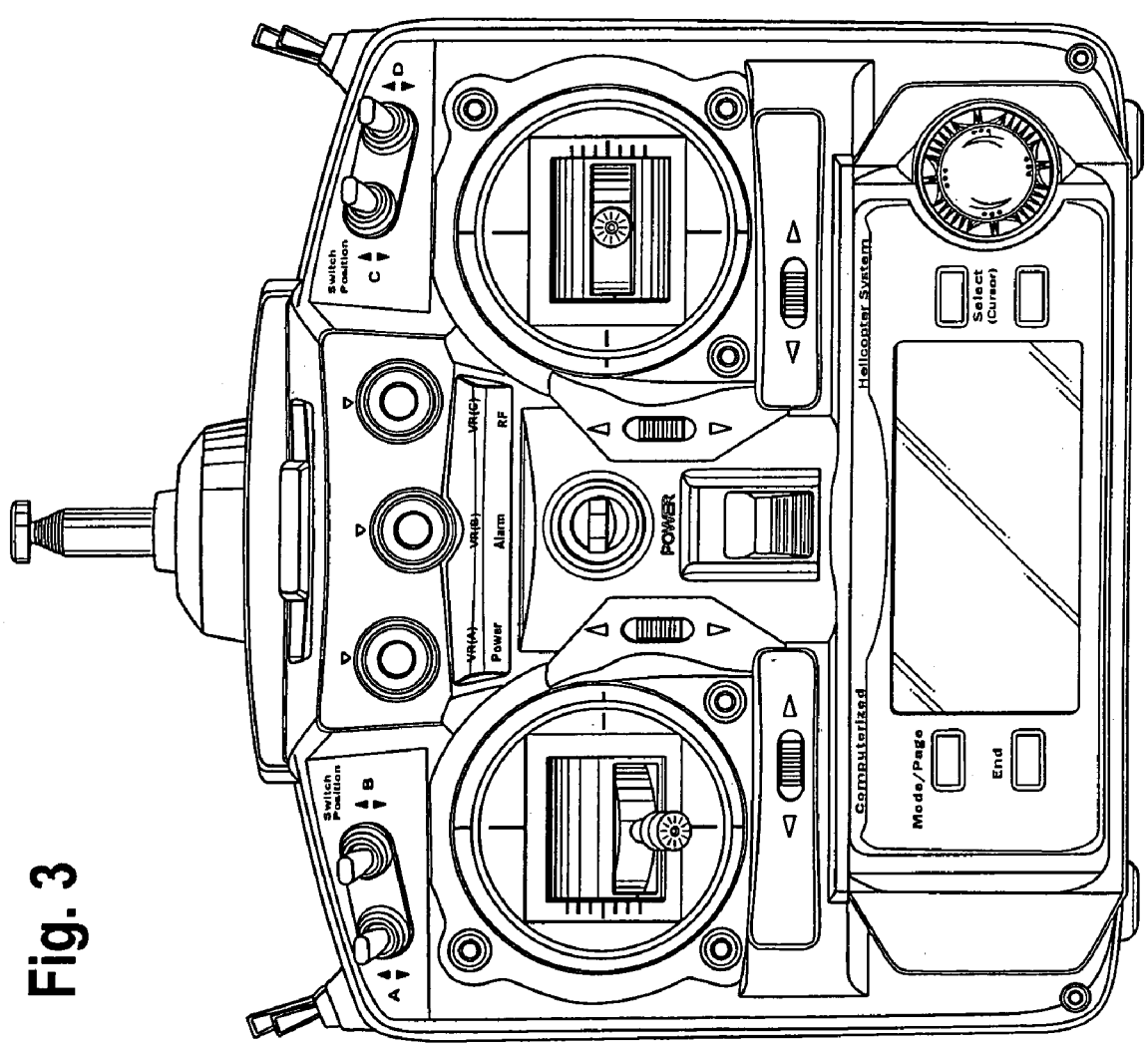
FIG. 3 is a top view of a remote wireless transmitter for operating and controlling the piloted aircraft (i.e., the Propo is used for a large gas twin cylinder helicopter).
Figure 4:
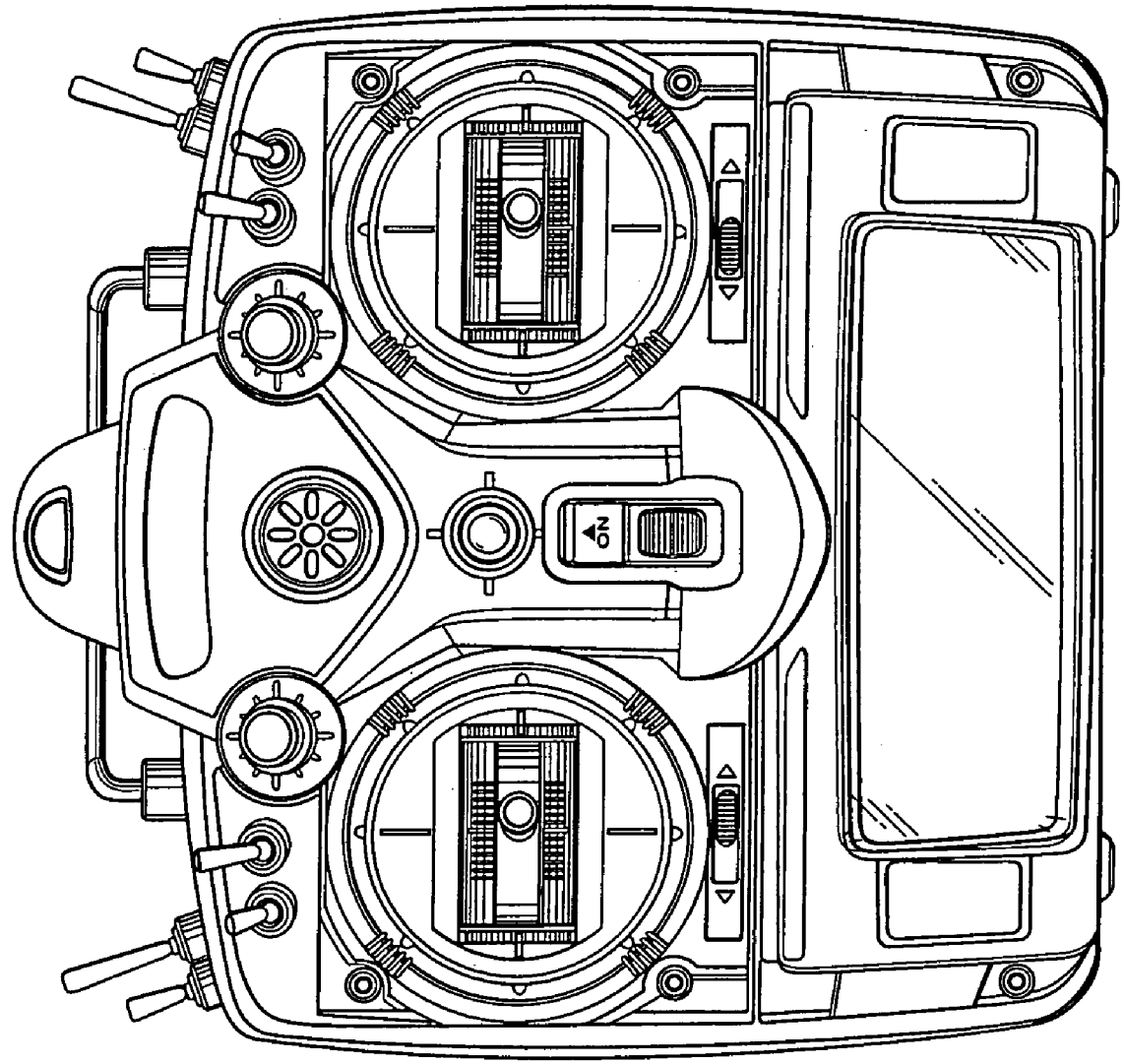
FIG. 4 is a top view of a remote wireless transmitter for operating and controlling the piloted aircraft (i.e., the T9 is used for a miniature single cylinder helicopter).

Using the appropriate remote wireless transmitter as illustrated in FIGS. 3, 4, the transmitter transmits a series of command signals which is received by the receiver on the servo 46 for controlling the operation of the remote controlled piloted aircraft 22. Upon application of these command signals, the remote controlled piloted aircraft 22 takes off from the launch pad and is flown to a desired location at a specific altitude above a particular property. In the preferred embodiment, this desired location is a stationary position above the ground where the panoramic aerial photograph is to be taken.

The video camera 26 is then used to confirm the desired location. In use, the video camera transmits a series of video images through the video electrical wire 54 to the servo 46. The servo 46 transmits the video images from the remote controlled piloted aircraft 22 to a remote wireless video receiver. In the preferred embodiment, the remote wireless video receiver is any standard receiver available today and/or known to one skilled in the art. These video images are visually displayed by the remote wireless video receiver and used to confirm that the remote controlled piloted aircraft 22 and the camera 42 are at the desired location. Alternatively, a global positioning system may be utilized to position the remote controlled piloted aircraft 22 into the desired location or any other means known to one skilled in the art.

Taking into consideration wind and other factors, the remote controlled piloted aircraft 22 is to be maintained in a substantially stationary flight at this desired location. To maintain the remote controlled piloted aircraft 22 in this substantially stationary flight, the remote controlled piloted aircraft 22 will be positioned at an aircraft orientation relative to the ground. For a calm day with relatively no wind, the remote controlled piloted aircraft 22 will be parallel to the ground and provide a substantially horizontal aircraft orientation or zero degrees (0°) relative to the ground. For mild winds, the remote controlled piloted aircraft 22 will have a particular pitch and yaw with respect to the direction and speed of the wind to maintain the remote controlled piloted aircraft 22 in the desired location. At this particular position, the remote controlled piloted aircraft 22 will form a mild aircraft orientation of approximately zero degrees (0°) to five degrees (5°) relative to the ground. For high winds, the particular pitch and yaw to account for these winds conditions typically results in an aircraft orientation of approximately five degrees (5°) or higher.

Despite the aircraft orientation of the remote controlled piloted aircraft 22, the camera system 28 must be maintained in a vertical orientation or at ninety degrees (90°) relative to the ground. In this manner, the camera lens 43 (i.e., always at ninety degrees to the camera system 28) will be positioned in a horizontal plane parallel to the ground for taking the panoramic aerial photograph. The rigid member 52 accomplishes this result. As the remote controlled piloted aircraft 22 is sustained at the aircraft orientation, the rigid connection between the support base 34 and the platform 24 will force the platform 24 to likewise be at substantially the same orientation as the aircraft orientation. While this is happening, the gravitational weight of the camera system 28 will naturally pull upon the camera system 28 in a downwardly direction toward the vertical orientation relative to the ground. As this occurs, the rotatable joint 60 of the rigid member 52, independent of the aircraft orientation, will enable the camera system 28 to move and reach this vertical orientation.

Figure 5:
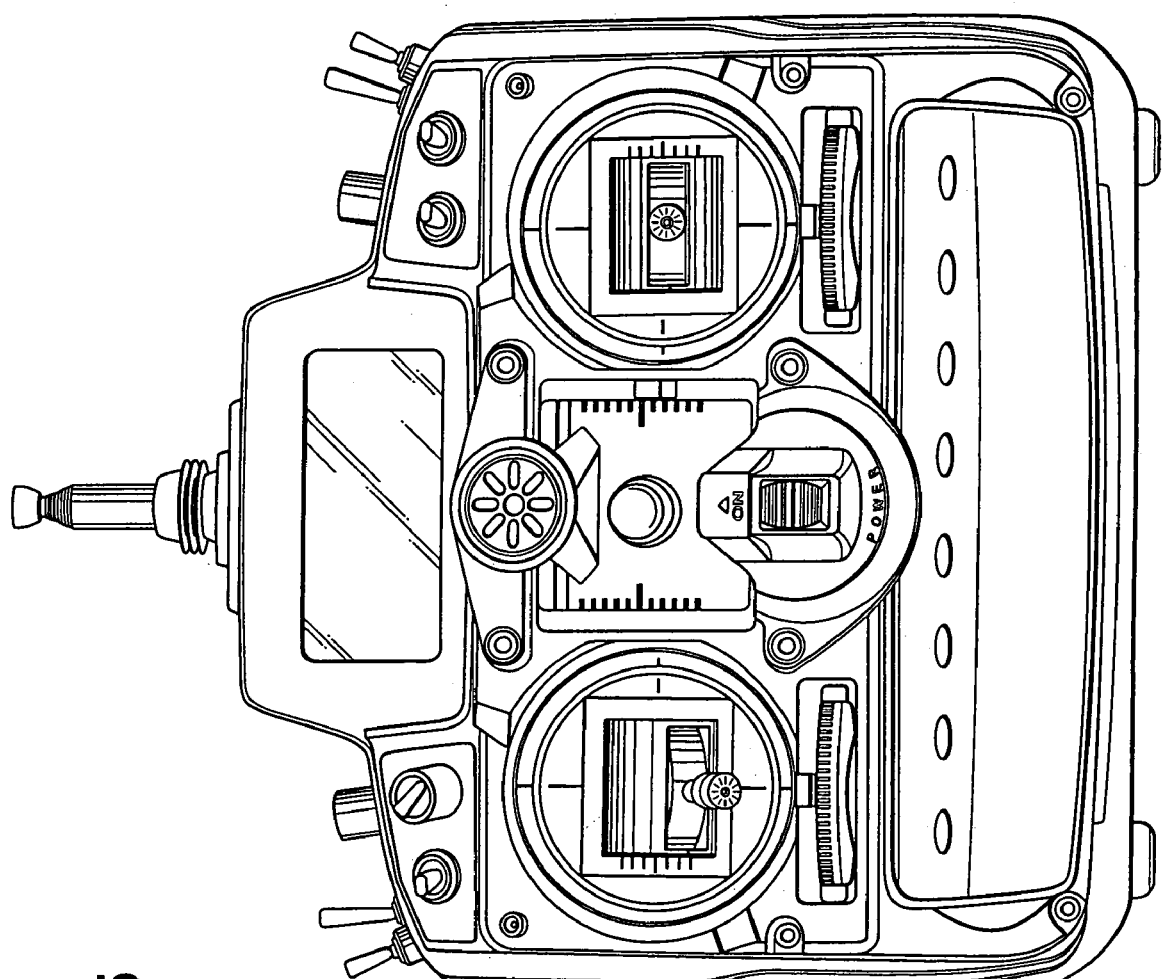
FIG. 5 is a top view of the remote wireless transmitter for operating and controlling the camera equipment.
Figure 6:
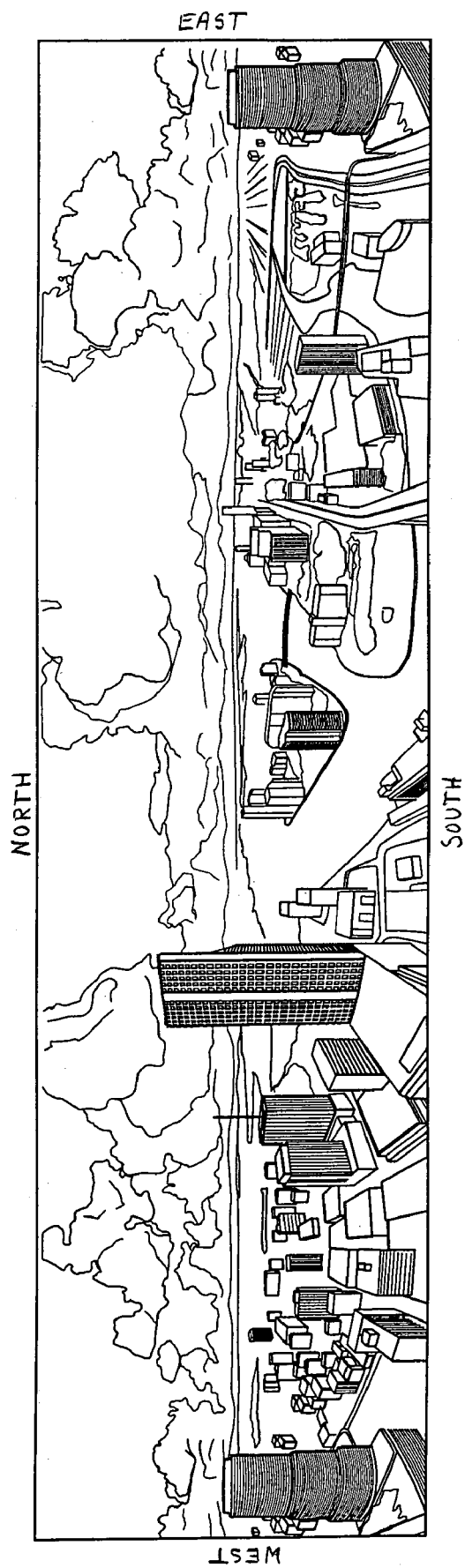
FIG. 6 is a three hundred and sixty degree seamless panoramic aerial photograph created by Applicant's invention.

Once the desired location is confirmed, the camera system 28, using the remote wireless transmitter as illustrated in FIG. 5, is activated to transmit an activation signal to the receiver on the servo 46. The servo 46 receives the activation signal and transmits the received activation signal through the electrical wire 48 to activate the motor 40 and the rotation of the camera 42. Once activated, the camera 42 starts filming, rotates continuously through three hundred and sixty degree turns for the entire length of the film (approximately 8 turns), and then stops filming. The camera system 42 is maintained in a level balance or constant, horizontal plane throughout the 360 degree rotation using the counterbalance weight 50. The remote controlled piloted aircraft 22 is then returned to and landed on the launch pad. The film is retrieved and processed from the camera system 28. The end result is a three hundred and sixty degree panoramic aerial photograph depicting the exact perspective of all the views for that desired location. FIG. 6 is a representative example of such a three hundred and sixty degree panoramic aerial photograph.

Figure 7:
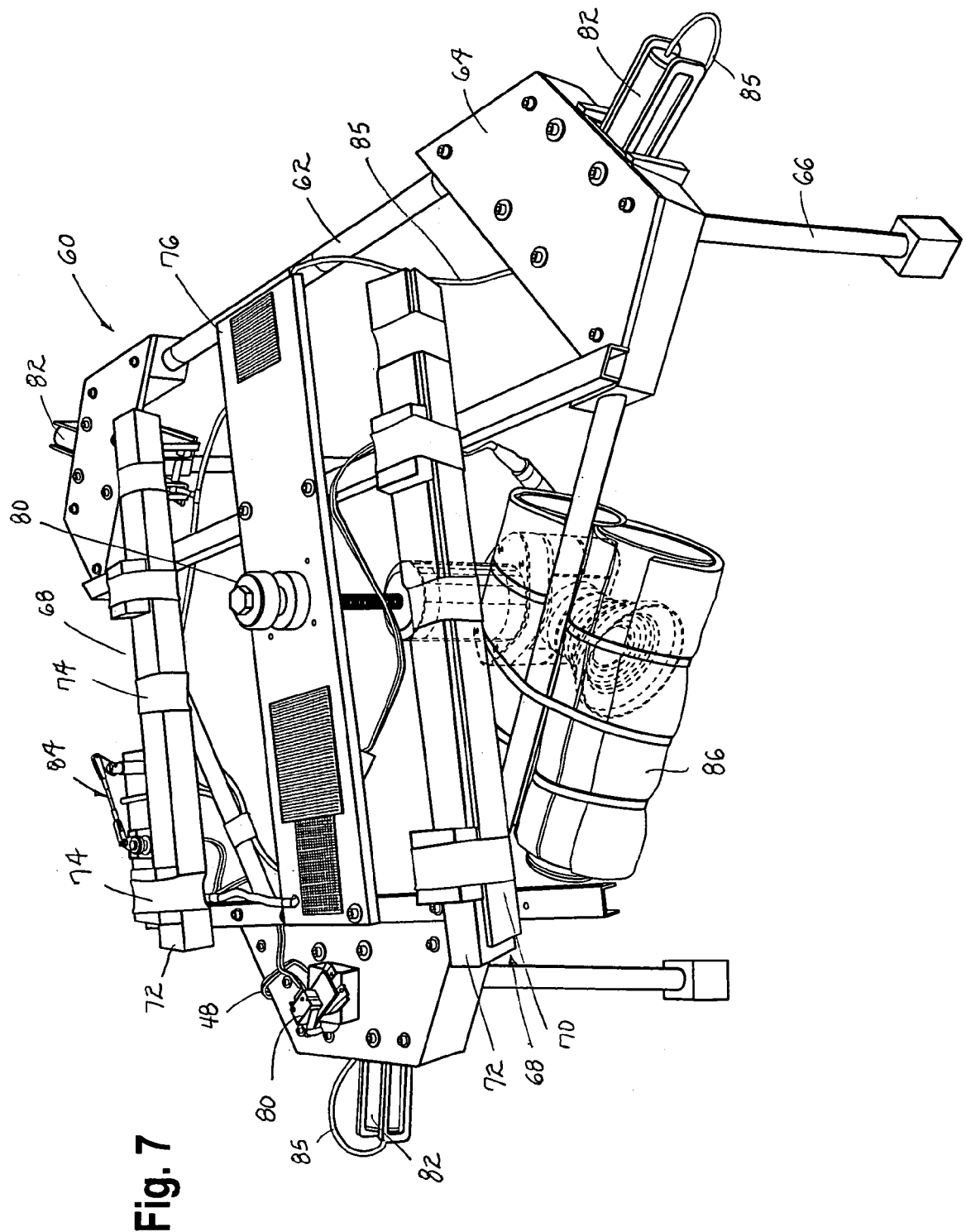
FIG. 7 is a perspective view of an alternate platform for Applicant's invention and, in particular, illustrating the means for attaching the camera equipment to the platform, the means for activating the camera, and the means for retracting the legs of the platform.
Figure 11:
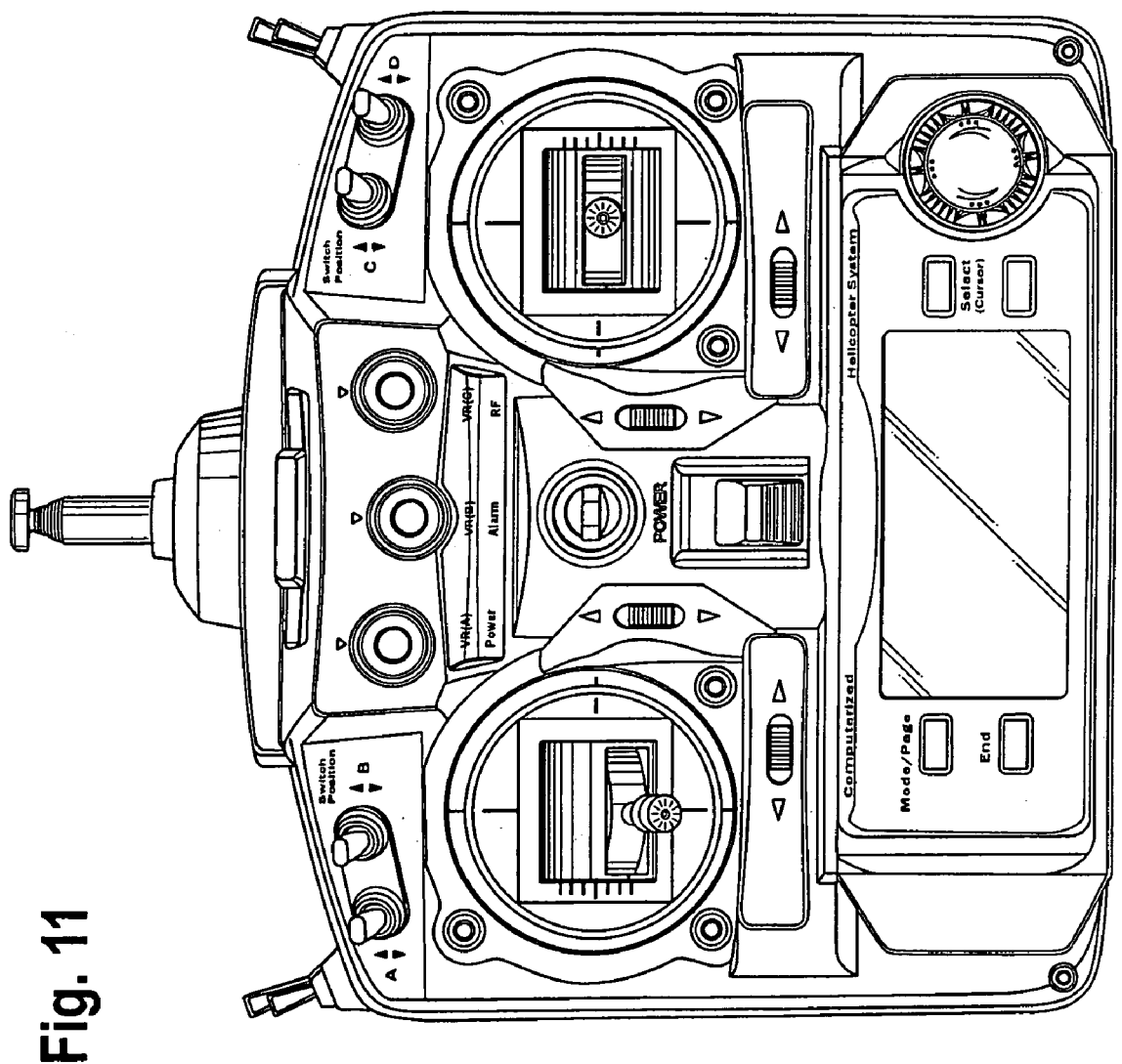
FIG. 11 is a top view of a remote wireless transmitter for operating and controlling the piloted aircraft, the camera, and the retractable legs in the alternate embodiment.

In an alterate embodiment, a different platform 60, as illustrated in FIG. 7, is used. As will be seen in the following disclosure, this platform 60 is more versatile than platform 24. The remote controlled piloted aircraft 22 remains the same in this alternate embodiment. Also, the various remote wireless transmitters of the original embodiment have been combined into a single remote wireless transmitter, as illustrated in FIG. 11, to provide all the required transmitted signals.

Figure 8:
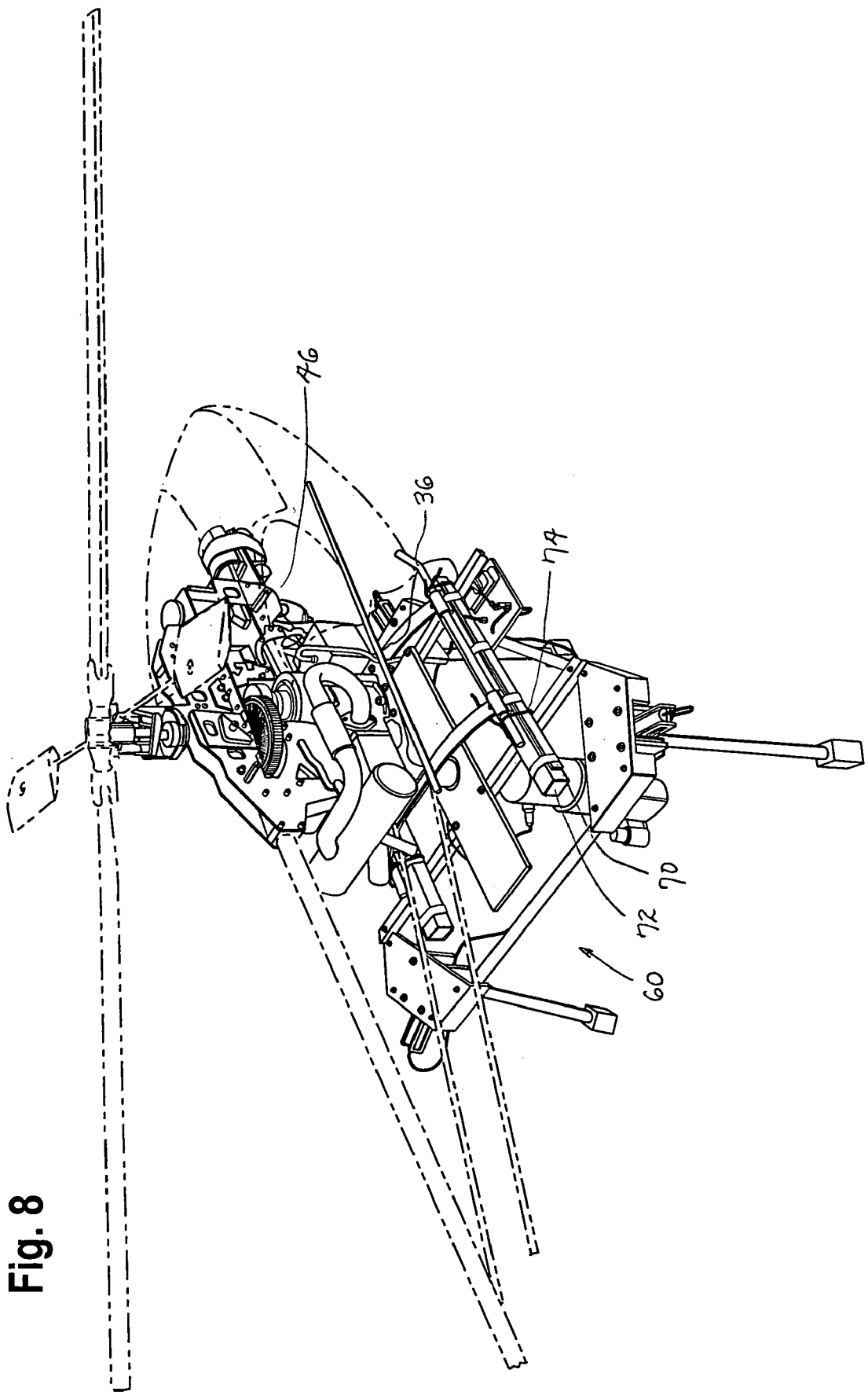
FIG. 8 is a perspective view of the alternate platform and, in particular, illustrating the attachment of the remote controlled piloted aircraft to the alternate platform.

This platform 60 comprises a frame 62, support ends 64, legs 66, and a pair of arms 68. Each arm 68 provides an elongated L-bracket 70 that is affixed to the frame 62 and a cushion 72 that is situated lengthwise to substantially cover the entire L-bracket 70. The pair of landing gear skids 36 from the helicopter are aligned with the pair of arms 68 such that each skid 36 sits directly on a corresponding cushion 72. A fastening means 74 is used to secure each landing gear skid 36 to the arms 68. In the preferred embodiment, the fastening means 74 is a bungee cord. In this manner, the helicopter is secured to the platform 60 as illustrated in FIG. 8. Alternatively, the fastening means 74 includes but is not limited to rope, twine, ties, brackets, hook and loop fasteners, or any other means known to one skilled in the art.

The cushion 72, while assisting in securing the helicopter to the platform 60, also provides another purpose. When the helicopter reaches the aircraft orientation with respect to the wind conditions, the helicopter, due to its attachment of the landing gear skids 36 to the arms 68, will pull the platform 60 into this same aircraft orientation. As this occurs, the cushion 72, due to its elastic and durable nature, will absorb some of the pressure exerted on it by the helicopter and the landing gear skids 36 and, thereby, enable the platform 60 to provide a platform orientation relative to the ground which is less than the aircraft orientation.

Figure 9:
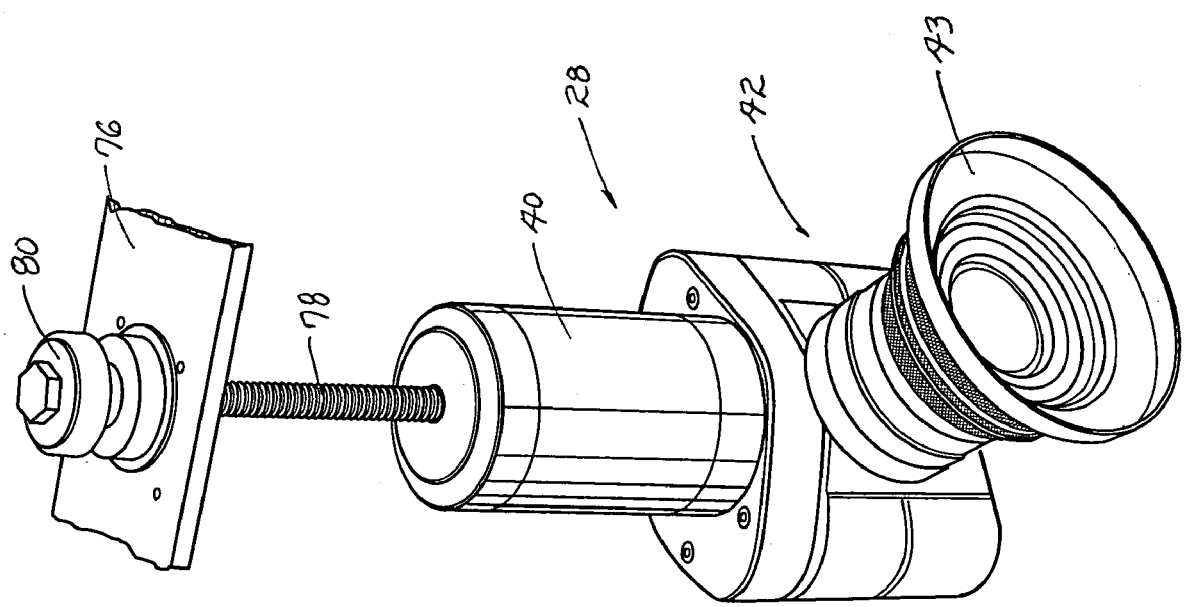
FIG. 9 is an enlarged side view of the alternate platform, with portions removed, and, in particular, illustrating the means for attaching the camera equipment to the alternate platform.

Attached to the frame 62 is also a flat plate 76. The flat plate 76 is substantially identical to the flat plate 32 of the original embodiment. Situated in the flat plate 76, at approximately the centerpoint of the platform 60 is a hole (not illustrated) to receive a rigid bolt 78. The rigid bolt 78 is attached to a rubber gromet 80 on one side of the flat plate 76 and to the camera system 28 on the other side of the flat plate 76. This is also more clearly illustrated in FIG. 9. This particular attachment means is used in situations where the cushion 72 platform accounts for substantially all of the aircraft orientaiton such that the platform orientation is substantially horizontal or zero (0°) degrees in relation to the ground. In this situation, the camera 42 will always be in its substantially vertical orientation or position relative to the ground for taking the panoramic aerial photograph.

A camera microswitch 80 is attached to one of the support ends 64 of the frame 62. This camera microswitch 80 receives, from the electrical wire 48, the transmitted activation signal received from the servo 46 (FIG. 1). Upon receiving the activation signal, the microswitch 80 opens the circuit to supply power to the motor 40 of the camera system 28 and starts the rotation of the camera 42. Once activated, the camera 42 starts filming, rotates continuously through three hundred and sixty degree turns for the entire length of the film (approximately 8 turns), and then stops filming.

Figure 10:
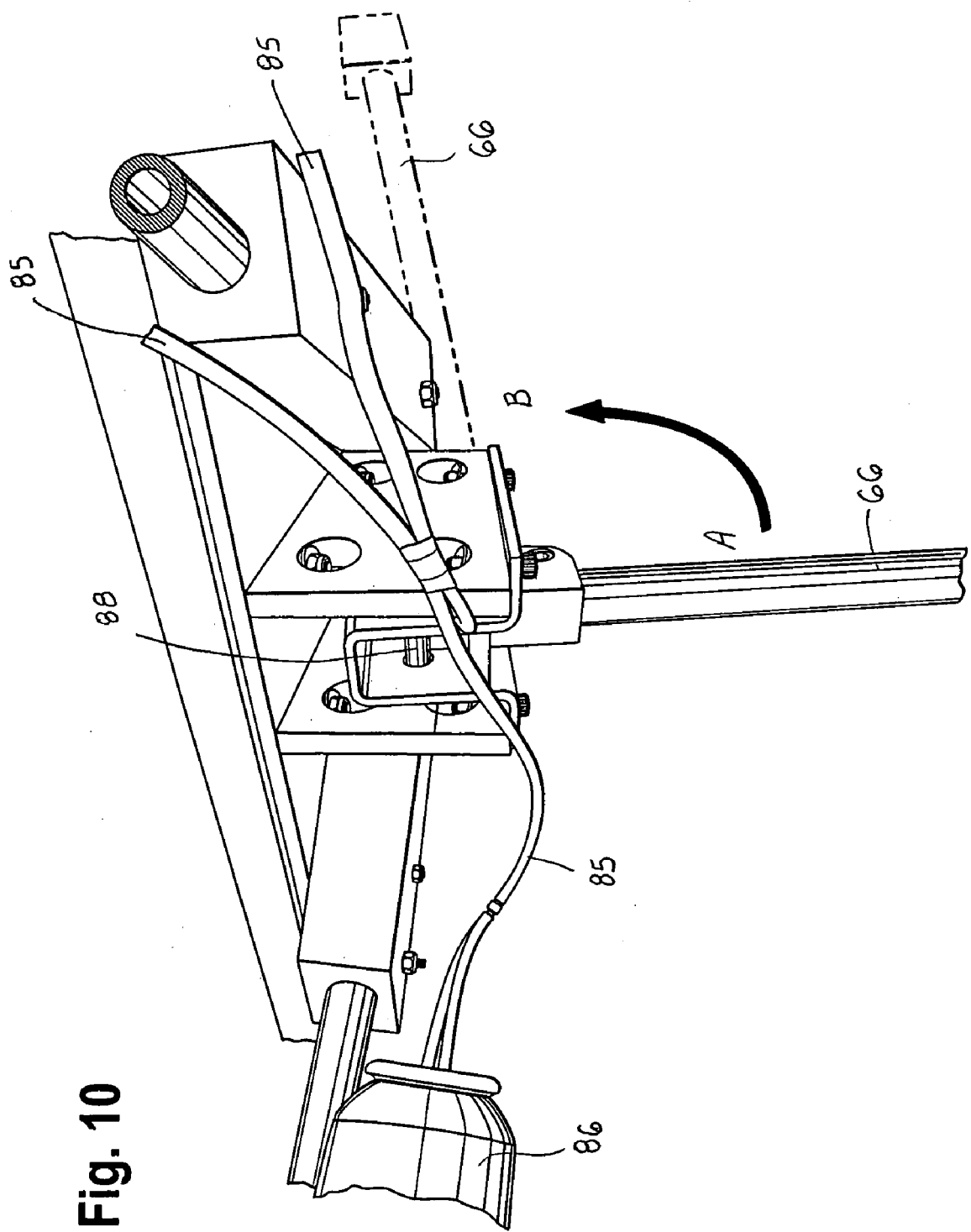
FIG. 10 is a perspective view of the alternate platform, with portions removed, and, in particular, illustrating the leg of the alternate platform as it retracts from the take off or landing position to the retracted flying position.

The platform 60 also provides legs 66 that are retractable. To accomplish this, an air pressurized hydraulic system is employed. At each support end 64 of the frame 62, the legs 66 are attached to pressure cylinders 82. The pressure cylinders 82 are connected, through air hoses 85, to an air valve microswitch 84 attached to one of the support ends 64 of the frame 62. The air valve microswitch 84 is connected, through air hoses 85, to air canisters 86 filled with compressed air. In the preferred embodiment, the air canisters 86 are secured to the frame 62 between support ends 64. In use, the servo 46 (FIG. 1) receives the transmitted signal from the remote wireless transmitter. The servo 46 receives the transmitted signal and sends the signal to the air valve microswitch 84. The air valve microswith 84 moves a mechanical arm to open the valve and release compressed air from the air canisters 86. The compressed air travels through the air hoses 85 to the pressurized cylinders 82 which are forced by the compressed air to compress. As the pressurized cylinders 82 compress, a spring loaded mechanism 88 forces the legs 66 to move, as illustrated in FIG. 10, from a take-off or landing gear position A to a retracted flying position B. Alternatively, any other means known to one skilled in the art may be used to retract the legs 66 of the platform 60.

Figure 12:
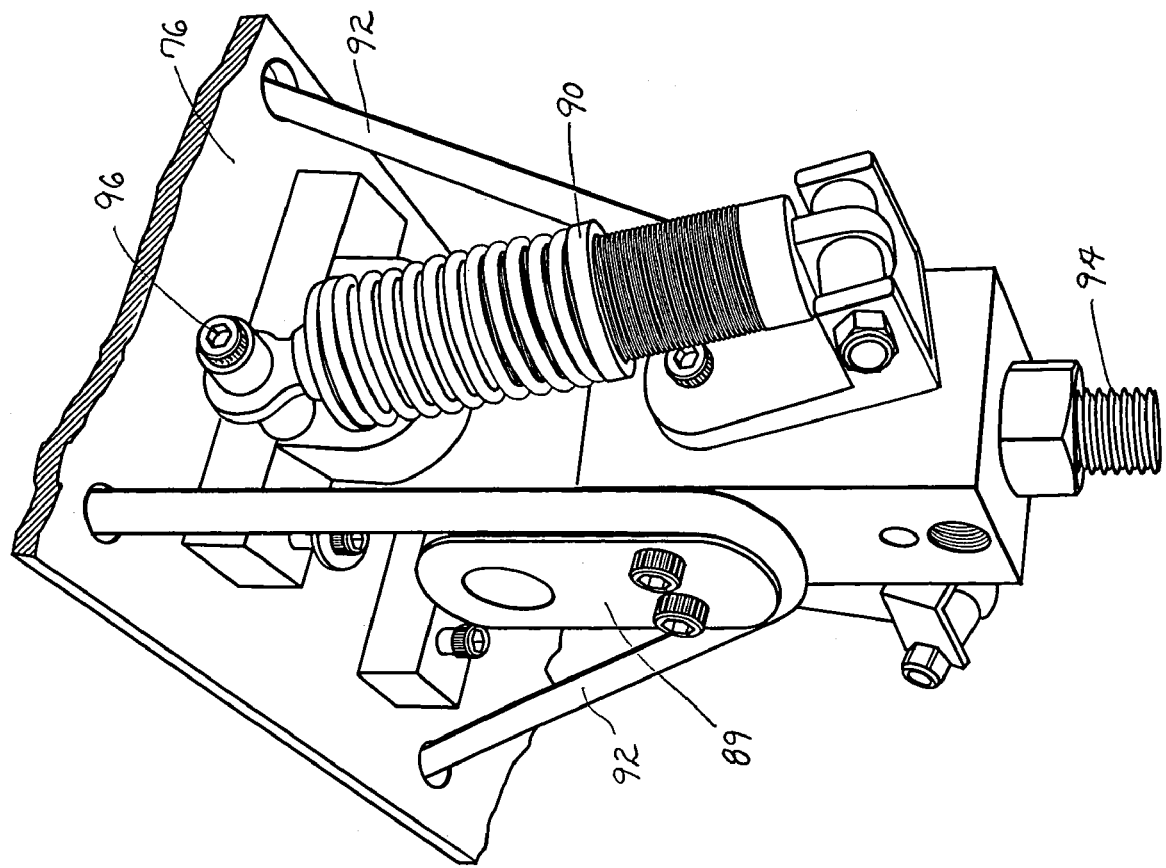
FIG. 12 is an enlarged perspective view, with portions removed, of an alternate suspension means embodiment for attaching the camera to the alternate platform.
Figure 13:
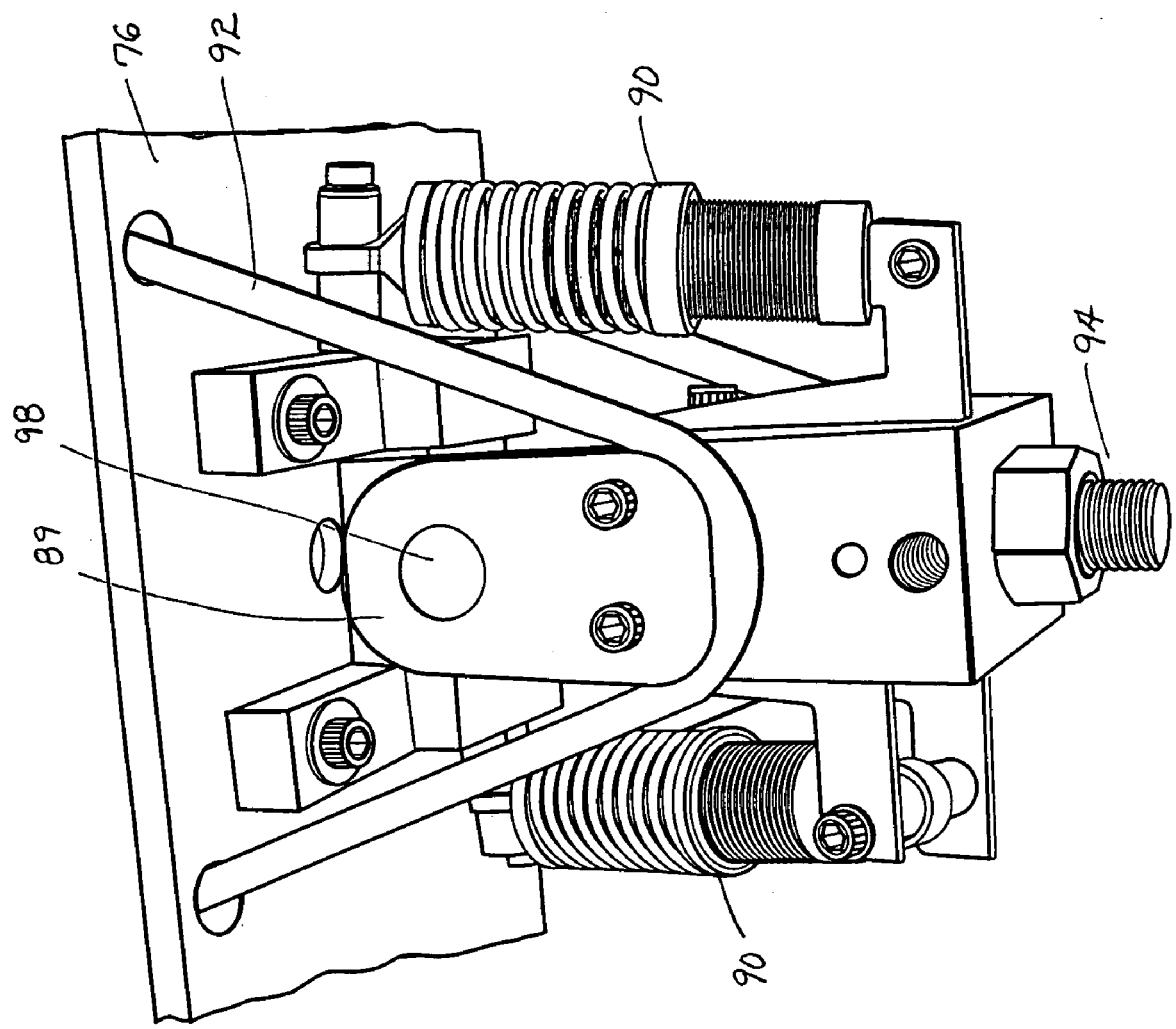
FIG. 13 is another enlarged perspective view, with portions removed, of the alternate suspension means embodiment for attaching the camera equipment to the alternate platform.

Referring to FIGS. 12 and 13, an alternate suspension means for attaching the camera system 28 to the alternate platform 60 is illustrated. The alternate suspension means comprises a pivot member 89, dual shocks 90, dual belts 92, and a threaded bolt 94 for attaching the suspension means to the camera system 28. At the opposite end of the pivot member 89, the pivot member 89 is securely attached to the flat plate 76.

As discussed previously, when the remote controlled piloted aircraft 22 is at the desired location, the remote controlled piloted aircraft 22 is at an aircraft orientation which accounts for the aircrafts pitch and yaw with respect to the external wind forces exerted upon it as the remote controlled piloted aircraft 22 is maintained at the desired location. In the higher wind conditions, the cushion 72 is unable to account for all of the aircraft orientation to enable the camera 42 to be maintained at the vertical orientation or position relative to the ground. In this circumstance, rather than using the rigid bolt 78, the suspension means attachment is used for attaching the camera system 28 to the platform 60 and, thereby, account for the remainder of the aircraft orientation such that the vertical orientation can be achieved.

When the remote controlled piloted aircraft 22 pitches forward or backward, the dual belts 92, along with the gravitational weight of the camera system 28, provides a counter tension with the flat plate 76 and rotates the camera system 28 about a pivot axis 96 (FIG. 12) of the pivot member 89 to counter the movement of the remote controlled piloted aircraft 22. When the remote controlled piloted aircraft 22 rolls or yaws left to right, the dual shocks 90, along with the gravitational weight of the camera system 28, provides a counter tension with the flat plate 76 and rotates the camera system 28 about a pivot axis 98 (FIG. 13) of pivot member 89 to counter this movement of the remote controlled piloted aircraft 22. As a result, the combination of the cushion 72, the dual belts 92, and the dual shocks 90 coact to maintain the camera system 28 in the vertical orientation or position relative to the ground independent of the aircraft orientation of the remote controlled piloted aircraft 22.

Thus, there has been provided a unique method and apparatus for creating three hundred and sixty degree panoramic photographs that may be taken at varying desired locations using the photography device described herein. While the invention has been described in conjunction with a specific embodiment, it is evident that many alternatives, modifications and variations will be apparent to those skilled in the art in light of the foregoing description. Accordingly, it in intended to embrace all such alternatives, modifications and variations and as may ultimately fall within the spirit and scope of any claims.

What is claimed is:

1. A device for creating a panoramic aerial photograph at a desired location above the ground, comprising:
   a camera;
   a helicopter for moving the camera in the air;
   a pair of skids for supporting the helicopter;
   a platform for attaching the camera to the helicopter, the platform comprising a flat plate having a top surface and a bottom surface and a pair of landing posts each having a central portion and opposed outer portions, the central portion of each landing post attached to the flat plate with the outer portions of each landing post extending outwardly from the flat plate, the pair of skids of the helicopter attached to the outer portions of the landing posts, the camera attached to the platform below the bottom surface;
   means for controlling the helicopter for positioning the camera at the desired location, the desired location defining a stationary position above the ground where the panoramic aerial photograph is to be taken; and
   means for activating the camera at the desired location to create the panoramic aerial photograph.

2. The device of claim 1 wherein the camera is a three hundred and sixty degree rotating panoramic camera.

3. The device of claim 1 wherein the helicopter is selected from the group consisting of gas powered and electric powered.

4. The device of claim 1 wherein the camera is attached to the flat plate by a rotatable joint for enabling the camera to be gravitationally aligned in a vertical orientation relative to the ground.

5. The device of claim 1 wherein the camera is attached perpendicularly to the platform and suspended in an inverted position.

6. The device of claim 1 and further comprising a receiver mounted in the remote controlled aircraft.

7. The device of claim 6 wherein the means for controlling the helicopter is a first remote wireless transmitter, the first remote wireless transmitter transmitting a plurality of command signals which are received by the receiver for controlling the helicopter and positioning the camera at the desired location.

8. The device of claim 6 and further comprising a means for viewing the position of the helicopter and the camera relative to the desired location.

9. The device of claim 6 wherein the means for viewing the position is a video camera mounted in the helicopter.

10. The device of claim 6 wherein the means for activating the camera is a second remote wireless transmitter, the second remote wireless transmitter transmitting an activation signal which is received by the receiver for activating the camera to take the panoramic aerial photograph.

11. The device of claim 1 and further comprising a counterbalance weight attached to the camera for stabilizing the camera when taking the panoramic aerial photograph.

12. A device for creating a panoramic aerial photograph at a desired location, the desired location defining a stationary position above the ground where the panoramic aerial photograph is to be taken, comprising:
a camera;
remote controlled aircraft for moving the camera in the air, the remote controlled aircraft further defining an orientation relative to the ground for maintaining the camera at the desired location;
a plate having a top surface and a bottom surface,
means for attaching the remote controlled aircraft to the top surface of the plate;
a pivot member for attaching the camera to the plate below the bottom surface for enabling the camera to be gravitationally aligned in a vertical orientation relative to the ground at the desired location and independent from the orientation of the remote controlled aircraft, the pivot member having a first pivot point and a second pivot point, a pair of shocks, and a pair of belts, the pair of shocks and the pair of belts coacting for enabling the camera to gravitationally rotate about both the first pivot point and the second pivot point for aligning the camera in a vertical orientation relative to the ground;
means for controlling the remote controlled aircraft for positioning the camera at the desired location; and
means for activating the camera at the desired location to take the panoramic aerial photograph.

13. A method for creating a panoramic aerial photograph at a desired location, the desired location defining a stationary position above the ground where the panoramic aerial photograph is to be taken, comprising the steps of:
providing a camera, a remote controlled aircraft, a plate having a top surface and a bottom surface, means for attaching the remote controlled aircraft to the top surface of the plate, means for attaching the camera below the bottom surface of the plate, means for controlling the remote controlled aircraft for positioning the camera at the desired location, means for activating the camera at the desired location to take the panoramic aerial photograph;
moving the remote controlled aircraft from a ground location to position the camera at the desired location;
positioning the remote controlled aircraft at an orientation relative to the ground for maintaining the camera at the desired location;
grativationally aligning the camera in a vertical orientation relative to the ground;
activating the camera to rotate through three hundred and sixty degrees for taking the panoramic aerial photograph; and
returning the remote controlled aircraft to the ground location.

14. A device for creating a panoramic aerial photograph at a desired location above the ground, comprising:
a camera;
a helicopter for moving the camera in the air;
a pair of skids for supporting the helicopter;
a platform for attaching the camera to the helicopter, the platform comprising a frame, a flat plate affixed to the frame, means for fastening the frame to the helicopter, a pivot member for attaching the camera to the flat plate, the pivot member having a first pivot point and a second pivot point, a pair of shocks, and a pair of belts, the pair of shocks and the pair of belts coacting for enabling the camera to gravitationally rotate about both the first pivot point and the second pivot point for aligning the camera in a vertical orientation relative to the ground;
means for controlling the helicopter for positioning the camera at the desired location, the desired location defining a stationary position above the ground where the panoramic aerial photograph is to be taken; and
means for activating the camera at the desired location to create the panoramic aerial photograph.

15. The device of claim 14 wherein the means for fastening the frame to the helicopter is a pair of elongated brackets and a cushion, each elongated bracket affixed to the frame and substantially covered by the cushion for supporting the pair of skids of the helicopter.

16. The device of claim 15 and further comprising means for securing the helicopter to the pair of elongated brackets and cushion.

17. A device for creating a panoramic aerial photograph at a desired location above the ground, comprising:
a camera;
a remote controlled aircraft for moving the camera in the air;
a platform for attaching the camera to the remote controlled aircraft, the platform comprising a frame having a plurality of support ends, each supported by a leg, a flat plate affixed to the frame, means for fastening the frame to the remote controlled aircraft, means for attaching the camera to the flat plate;
means for retracting the legs between a substantially vertical position relative to the ground for supporting the device when on the ground and a substantially horizontal position relative to the ground when the device is moving in the air;
means for controlling the remote controlled aircraft for positioning the camera at the desired location, the desired location defining a stationary position above the ground where the panoramic aerial photograph is to be taken; and
means for activating the camera at the desired location to create the panoramic aerial photograph.

* * * * *